(12) United States Patent
Firestone et al.

(10) Patent No.: US 7,908,480 B2
(45) Date of Patent: Mar. 15, 2011

(54) AUTHENTICATING AN ENDPOINT USING A STUN SERVER

(75) Inventors: Scott S. Firestone, Mountain View, CA (US); Cullen Jennings, San Jose, CA (US); Daniel G. Wing, San Jose, CA (US); Dan Touitou, Ramat Gan (IL)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 11/087,050

(22) Filed: Mar. 21, 2005

(65) Prior Publication Data

US 2006/0212702 A1  Sep. 21, 2006

(51) Int. Cl.
 *H04L 9/32* (2006.01)
 *H04L 29/00* (2006.01)
 *H04L 29/06* (2006.01)
 *G06F 7/04* (2006.01)
 *G06F 3/00* (2006.01)

(52) U.S. Cl. ........ 713/168; 713/150; 713/153; 713/169; 726/2; 726/3; 726/4; 710/8; 710/15; 709/223; 709/225; 709/237

(58) Field of Classification Search .......... 713/168, 713/150, 153, 169; 710/15, 8; 726/2, 3, 726/4; 709/223, 225, 237
See application file for complete search history.

(56) References Cited

U.S. PATENT DOCUMENTS

| | | | |
|---|---|---|---|
| 6,377,691 B1 | 4/2002 | Swift et al. | 380/277 |
| 6,711,400 B1 | 3/2004 | Aura | 455/411 |
| 6,785,823 B1 | 8/2004 | Abrol et al. | 713/201 |
| 6,842,860 B1 | 1/2005 | Branstad et al. | 713/170 |
| 6,918,035 B1 * | 7/2005 | Patel | 713/169 |
| 7,243,366 B2 * | 7/2007 | Medvinsky et al. | 726/2 |
| 2002/0023010 A1 * | 2/2002 | Rittmaster et al. | 705/26 |
| 2003/0070067 A1 * | 4/2003 | Saito | 713/150 |
| 2003/0079143 A1 * | 4/2003 | Mikel et al. | 713/200 |
| 2003/0093687 A1 | 5/2003 | Westhoff et al. | 713/200 |
| 2003/0226017 A1 | 12/2003 | Palekar et al. | 713/168 |
| 2004/0066769 A1 * | 4/2004 | Ahmavaara et al. | 370/338 |
| 2005/0050329 A1 * | 3/2005 | Wilding et al. | 713/171 |
| 2005/0055553 A1 | 3/2005 | Thomaidis | 713/176 |
| 2005/0081045 A1 * | 4/2005 | Nicodemus et al. | 713/182 |
| 2005/0105734 A1 * | 5/2005 | Buer et al. | 380/270 |
| 2005/0120216 A1 * | 6/2005 | Lee et al. | 713/171 |
| 2006/0111080 A1 * | 5/2006 | Bajar et al. | 455/411 |
| 2006/0165060 A1 * | 7/2006 | Dua | 370/352 |

(Continued)

OTHER PUBLICATIONS

H. Krawczyk, M. Bellare, R. Canetti, "HMAC: Keyed-Hashing for Message Authentication," Network Working Group, RFC 2104, 11 pages, Feb. 1997.

(Continued)

*Primary Examiner* — Syed A. Zia
*Assistant Examiner* — Sarah Su
(74) *Attorney, Agent, or Firm* — Baker Botts L.L.P.

(57) ABSTRACT

Authenticating an endpoint using a STUN server includes facilitating a communication session between a first endpoint and a second endpoint over a network. A challenge request is sent to the second endpoint. The challenge request attempts to authenticate the second endpoint and includes an identification. The identification is associated with an expected response identification. A response to the challenge request is received from the second endpoint. The response has an actual response identification. The received response is verified to establish whether the second endpoint is legitimate. The second endpoint is legitimate if the actual response identification includes the expected response identification.

25 Claims, 2 Drawing Sheets

U.S. PATENT DOCUMENTS

2006/0184681 A1* 8/2006 Bernardi et al. .............. 709/229
2007/0026942 A1* 2/2007 Kinsley et al. .................. 463/29
2008/0270618 A1* 10/2008 Rosenberg .................... 709/228

OTHER PUBLICATIONS

J. Rosenberg, J. Weinberger, C. Huitema, R. Mahy, Cisco, "STUN—Simple Traversal of User Datagram Protocol (UDP) Through Network Address Translators (NATs)," Network Working Group, RFC 3489, 37 pages, Mar. 2003.

R.T. Bell, "Selecting Transport Addresses to Route Streams Between Endpoints,", 31 pages.

PCT Notification of Transmittal of the International Search Report and the Written Opinion of the International Searching Authority, or the Declaration with attached PCT International Search Report and Written Opinion of the International Searching Authority in International Application No. PCT/US 06/06669, dated Sep. 28, 2007, 8 pages.

* cited by examiner

AUTHENTICATING AN ENDPOINT USING A STUN SERVER

TECHNICAL FIELD

This invention relates generally to the field of communications and more specifically to a system and method for authenticating an endpoint using a STUN server.

BACKGROUND

Telecommunications and data transmissions have merged into an integrated communication network using technologies such as Voice over Packet (VoP). Many communication networks transmit data using packet protocols, such as the Internet Protocol (IP). VoP uses the existing technology to transmit voice signals by converting the signals into digital data and encapsulating the data for transmission over a packet-based network. Many protocols that VoP uses, however, do not provide a way to identify the sender of packets in certain situations. For example, when an endpoint receives a media packet, the endpoint cannot determine if the packet was sent by a legitimate endpoint or by an illegitimate endpoint. It is generally desirable to determine whether an endpoint is legitimate in certain situations.

SUMMARY OF THE DISCLOSURE

In accordance with the present invention, disadvantages and problems associated with previous techniques for communicating with an endpoint may be reduced or eliminated.

According to one embodiment of the present invention, authenticating an endpoint using a STUN server includes facilitating a communication session between a first endpoint and a second endpoint over a network. A challenge request is sent to the second endpoint. The challenge request attempts to authenticate the second endpoint and includes an identification. The identification is associated with an expected response identification. A response to the challenge request is received from the second endpoint. The response has an actual response identification. The received response is verified to establish whether the second endpoint is legitimate. The second endpoint is legitimate if the actual response identification includes the expected response identification.

Certain embodiments of the invention may provide one or more technical advantages. A technical advantage of one embodiment may be that an endpoint may determine whether a sender of packets is legitimate or illegitimate. By authenticating the sender, the endpoint may detect an illegitimate flow of packets or packets that may attack the endpoint. Detecting the flow of packets before accepting the packets allows the endpoint to anticipate possible attacks and reject illegitimate packet flows.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
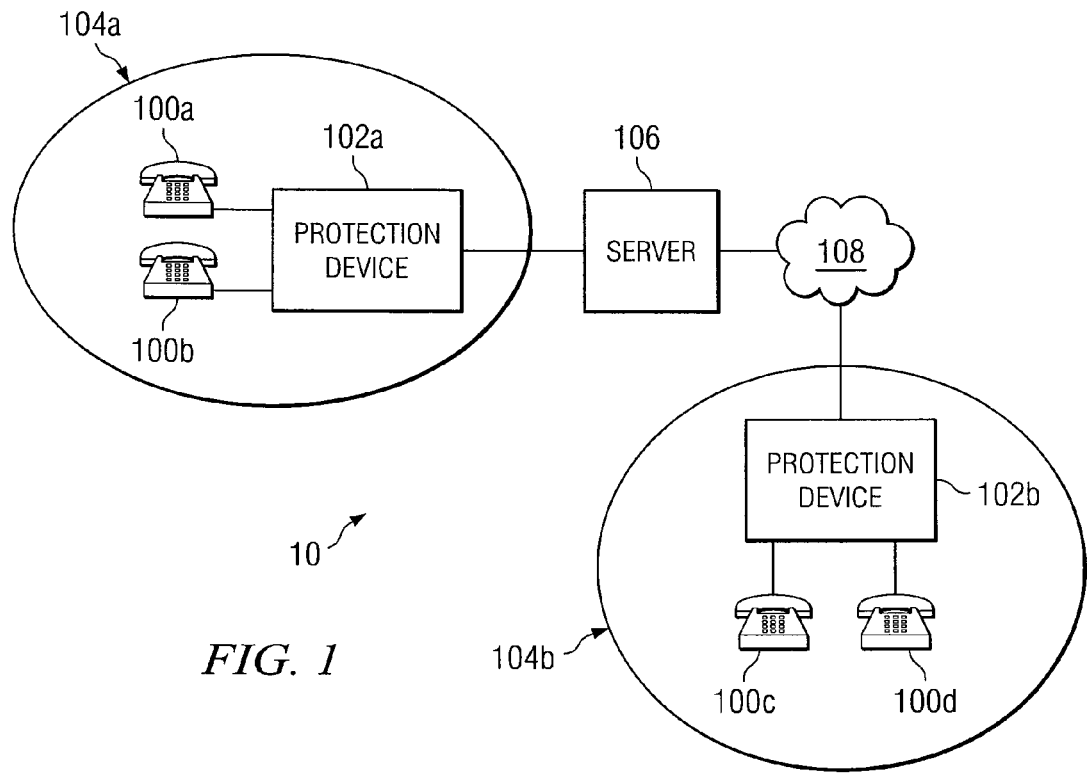
FIG. 1 is a block diagram of one embodiment of a system that may be used to authenticate an endpoint.
Figure 2:
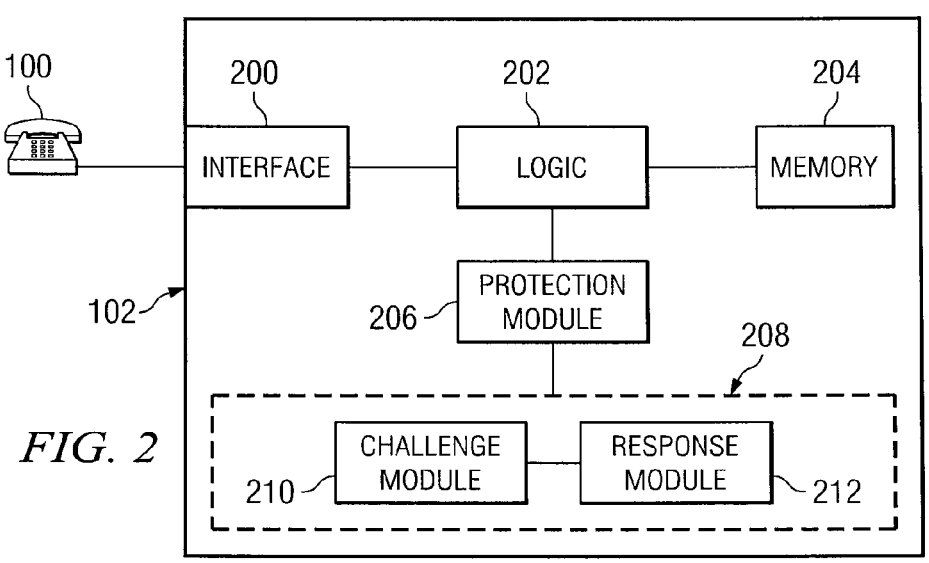
FIG. 2 is a block diagram of one embodiment of a protection device that includes an authentication module that may be used to authenticate the endpoint.
Figure 3:
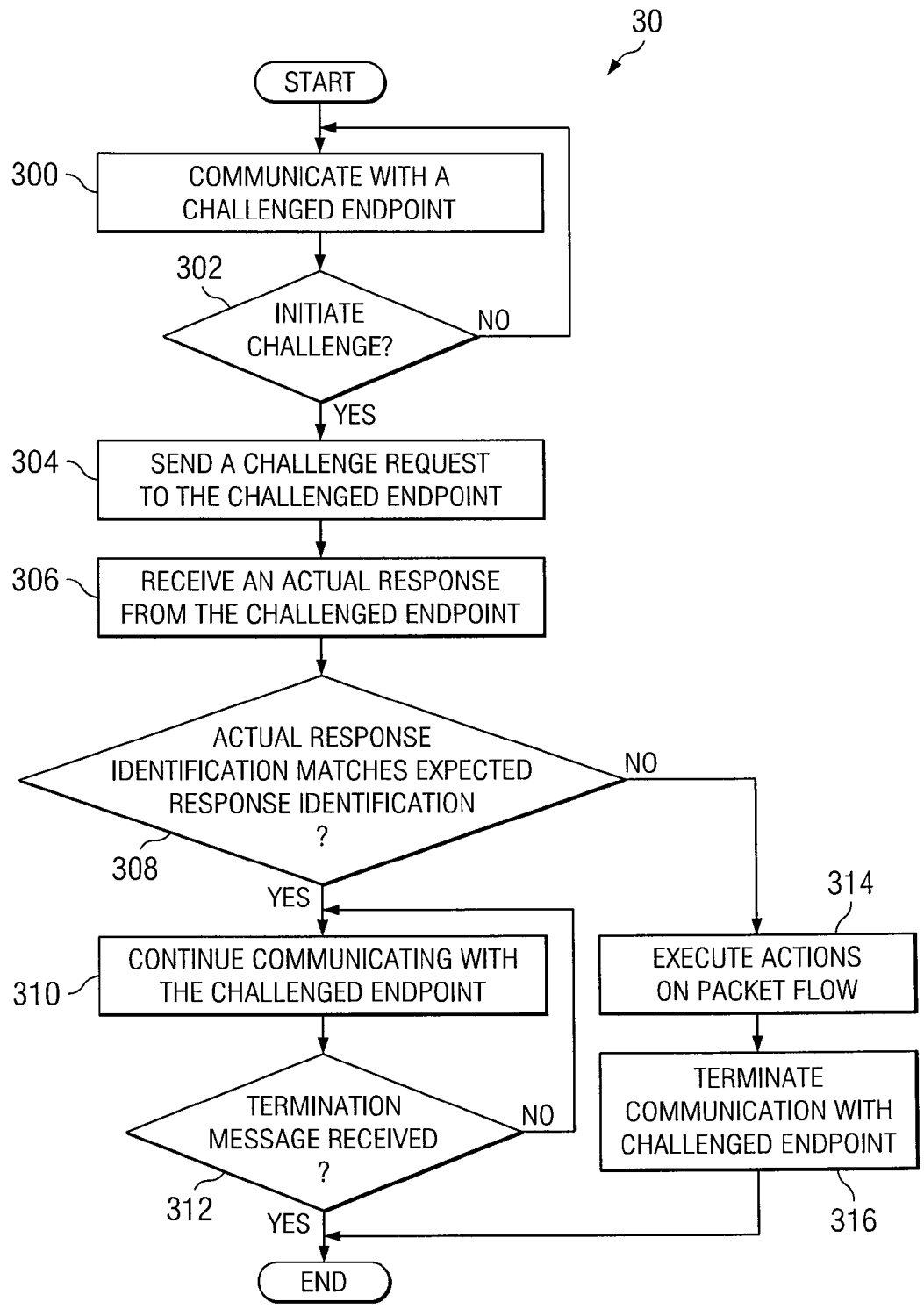
FIG. 3 is a flowchart illustrating one embodiment of a method for authenticating the endpoint.

Embodiments of the present invention and its advantages are best understood by referring to FIGS. 1 through 3 of the drawings, like numerals being used for like and corresponding parts of the various drawings.

FIG. 1 is a block diagram of a system 10 for authenticating an endpoint. System 10 includes a Simple Traversal of User datagram protocol (UDP) through Network address translators (NATs) (STUN) server. The STUN server facilitates communication between endpoints and participates in the determination of whether an endpoint is a legitimate or illegitimate endpoint. Upon determining whether the endpoint is legitimate, the endpoint receiving the packet flows may execute an action on the packet flows received from the endpoint.

According to the illustrated embodiment, system 10 includes local networks 104, a server 106, and a communication network 108 coupled as shown. A local network 104 includes endpoints 100 and a protection device 102 coupled as shown.

System 10 includes local networks 104*a-b*. A network may represent any suitable combination or arrangement of components supporting communication between endpoints 100. A network may comprise a local area network (LAN), a wide area network (WAN), the Internet, other suitable communication networks, or any combination of the preceding. As an example, local network 104*a* may comprise a local area network. Internal addresses may be used to communicate among devices of the same local network 104, and external addresses may be used to communicate among devices of distinct local networks 104. An internal address may refer to an address that is not provided to networks outside of local network 104. An external address may comprise a public Internet Protocol (IP) address provided to networks outside of local network 104.

Local network 104*a* includes endpoints 100*a-b*, and local network 104*b* includes endpoints 100*c-d*. An endpoint 100 may include hardware, software, or any combination of the preceding that provides communication services to a user. An endpoint 100 may comprise a telephone, an IP telephone, a personal computer, video-conferencing equipment, a server, or any other suitable device. An endpoint 100 may support, for example, Internet Protocol or any other suitable communication protocol. Although system 10 illustrates a particular number and arrangement of endpoints 100, system 10 contemplates any suitable number and arrangement of endpoints 100.

Endpoints 100 receive and transmit information over communication network 108 during a communication session. A communication session may refer to an arrangement between endpoints 100 that allows for the exchange of information between endpoints 100. A communication session involves the transfer of packets between endpoints 100. Endpoints 100 may exchange packets within local network 104 or may exchange packets with endpoints 100 external to local network 104. A packet may comprise a bundle of information organized in a specific way for transmission. A packet may carry any suitable information such as voice, data, multimedia, other information, or any combination of the preceding. In an embodiment, endpoints 100 may communicate the packets in real time using a real-time protocol. A packet flow may refer to packets communicated from one device to another and may have voice, multimedia, or other packet types.

According to the illustrated embodiment, local networks 104 include protection devices 102a-b coupled to endpoints 100. Protection device 102 protects endpoint 100 from receiving attacks that may cripple endpoint 100. In an embodiment, protection device 102 comprises a Distributed Denial of Service (DDoS) device. For example, the attacks may include DDoS attacks that send a flood of bogus home page requests to a web server and shuts out legitimate consumers, or may include attacks that compromise the availability and accuracy of Domain Name System servers. Protection device 102 monitors the packet flows to determine attack patterns and evolving attack patterns. If suspicious packet flows are detected, protection device 102 executes an action. The action may include notifying endpoint 100 of the suspicious packet flow, diverting the packet flow to filtering mechanisms, or any suitable action to protect endpoint 100 from a suspicious packet flow.

Server 106 represents any suitable combination or arrangement of logic for determining transport addresses for endpoints 100. A transport address may refer to a location at which a packet flow may be received. A transport address may comprise, for example, an IP address and a port at which packet flows may be received, or may comprise any other suitable address. Server 106 may provide transport addresses using any suitable protocol, such as STUN. Server 106 may associate with a network or any suitable combination of networks. In the illustrated embodiment, server 106 associates with local network 104a and local network 104b. In another embodiment, local network 104b associates with another server 106.

Communication network 108 may comprise any suitable network that allows communication between other networks or devices. A network may represent any suitable combination or arrangement of components supporting communication between endpoints 100, local networks 104, or a combination of the preceding. A network may comprise a local area network (LAN), a wide area network (WAN), the Internet, other suitable communication networks, or any combination of the preceding.

According to an example embodiment of operation, an endpoint 100a sends a packet to endpoint 100c. When endpoint 100c receives the packet, it cannot determine from the packet flow whether the endpoint 100a is a legitimate endpoint or an illegitimate endpoint. To authenticate endpoint 100a, endpoint 100c (challenger endpoint 100c) challenges the authenticity of endpoint 100a (challenged endpoint 100a) by sending a challenge request to challenged endpoint 100a. Challenged endpoint 100a generates a response to the received challenge request. If the generated response corresponds to the challenge request, challenged endpoint 100a is legitimate. Challenger endpoint 100c continues receiving the packet flow from challenged endpoint 100a upon authentication of challenged endpoint 100a.

However, if the generated response does not correspond to the challenge request, challenged endpoint 100a is determined to be illegitimate. Additionally, challenged endpoint 100a may also be determined to be illegitimate if challenged endpoint 100a does not respond to the challenge request. For example, if challenged endpoint 100a is not legitimate, challenger endpoint 100c may block the packet flow, ignore the packet flow, or perform any other suitable action to discontinue communication between challenged endpoint 100a and challenger endpoint 100c. Blocking the packet flow involves preventing the packet flow from reaching challenger endpoint 100c. Ignoring the packet flow involves allowing challenger endpoint 100c to receive the flow, but challenger endpoint 100c does not respond to the packet flow.

Modifications, additions, or omissions may be made to system 10 without departing from the scope of the invention. The components of system 10 may be integrated or separated according to particular needs. For example, protection device 102 may be integrated into endpoints 100. Moreover, the operations of system 10 may be performed by more, fewer, or other modules. Additionally, operations of system 10 may be performed using any suitable logic comprising software, hardware, other logic, or any suitable combination of the preceding.

FIG. 2 is a block diagram of a protection device 102 that includes an authentication module that may be used to authenticate an endpoint of system 10 of FIG. 1. Protection device 102 protects endpoint 100 from damaging attacks, and may authenticate another endpoint 100 to determine the legitimacy of a packet flow. In the illustrated embodiment, protection device 102 includes an interface 200, logic 202, a memory 204, a protection module 206, and an authentication module 208 coupled as shown.

Interface 200 receives and sends packets. An interface may refer to any suitable structure of a device operable to receive input for the device, send output from the device, or both, and may comprise one or more ports.

Logic 202 manages the operation of protection device 102 and may comprise any suitable hardware, software, or combination of hardware and software. For example, logic 202 may include a processor. A processor may refer to any suitable device operable to execute instructions and manipulate data to perform operations.

Memory 204 stores and facilitates the retrieval of information used by logic 202. Examples of memory 204 may include Random Access Memory (RAM), Read Only Memory (ROM), magnetic drives, disk drives, Compact Disk (CD) drives, Digital Video Disk (DVD) drives, removable media storage, other suitable data storage device, or any combination of the preceding.

Protection module 206 facilitates the protection of endpoint 100 from attacking packet flows. Protection module 206 may allow packet flows to proceed to endpoint 100, filter packet flows from endpoint 100, analyze packet flows to determine potential illegitimate flows, perform any other suitable action to recognize illegitimate packet flows and protect endpoint 100, or perform any suitable combination of the preceding. Protection module 206 may comprise any suitable hardware, software, or a combination of hardware or software.

In an embodiment, protection module 206 establishes a threshold for the highest amount of information endpoint 100 may receive from any other endpoint 100. Protection module 206 monitors the amount of packet flow between endpoints 100. If the amount of packet flow exceeds the established threshold, protection module 206 contacts authentication module 208 to begin the authentication process of endpoint 100.

Authentication module 208 facilitates the challenge and response exchange between a challenged endpoint 100a and a challenger endpoint 100c. Authentication module 208 may include one or more modules, hardware, software, or any suitable combination of the preceding to facilitate the authentication process. In the illustrated embodiment, authentication module 208 includes a challenge module 210 and a response module 212. Challenge module 210 and response module 212 may comprise hardware, software, or any suitable combination of the preceding to generate a challenge request, receive a response to the challenge request, and execute actions on the packet flow according to the received response.

According to an example embodiment of operation, protection module 206 contacts authentication module 208 to authenticate challenged endpoint 100a. For example, authentication module 208 may request authentication if the amount of information exceeds a threshold, if the packet flow has unfamiliar content, or if any other suitable occurrence happens for protection module 206 to question the legitimacy of challenged endpoint 100a.

Challenge module 210 generates a challenge request and sends the challenge request to challenged endpoint 100a. The challenge request is a message sent to challenged endpoint 100a to determine the authenticity of challenged endpoint 100a. The source address of the challenge request may comprise the IP address and port number of challenge module 210. In an embodiment, the challenge request communicates an identification. The identification includes a real-time protocol synchronization source (RTP SSRC) of a recently sent packet, a challenge type, and a sequence number. The RTP SSRC is a unique number chosen by challenger endpoint 100c that identifies the sent packet flow with a 32-bit numeric identifier. The sequence number correlates the challenge request with the response to authenticate challenged endpoint 100a. Challenge module 210 may challenge challenged endpoint 100a without having knowledge of a username or password exchanged in the call signaling. This allows any device to perform the challenge on behalf of a challenger endpoint 100c.

Upon verifying that the indicated RTP SSRC was recently sent, challenged endpoint 100a builds a response and sends the response to the source address of the challenge request. The response includes an actual response identification. The actual response identification includes information to establish whether challenged endpoint 100a is legitimate or illegitimate. Response module 212 receives the actual response identification and determines whether the response matches the expected response identification.

The expected response identification is the response response module 212 expects to receive if challenged endpoint 100a is legitimate. The expected response identification comprises the RTP SSRC and sequence number from the challenge request, a name verifier, or a combination of the preceding. If protection device 102 or server 106 sends the challenge request to challenged endpoint 100a, protection device 102 or server 106 may verify the response as legitimate if it comprises the sequence number from the challenge request. If endpoint 102 sends the challenge request, endpoint 102 may further verify the response by considering the name verifier associated with the challenged endpoint 100a.

The name verifier may comprise a valid SHA1-HMAC of a username, or any other suitable name verifier. SHA1-HMAC is a particular keyed-hash function described in the Internet Engineering Task Force (IETF) Request for Comments (RFC) 2104, which uses message authentication codes. SHA1 is a particular hash function that is used in combination with HMAC, the message authentication codes. The SHA1-HMAC is a STUN username linked to the RTP SSRC from the challenge request. Response module 212 determines if the actual response identification includes a valid SHA1-HMAC. If the SHA1-HMAC is valid, the packet flow continues between challenged endpoint 100a and challenger endpoint 100c. However, if the actual response identification includes an invalid SHA1-HMAC, challenger endpoint 100c blocks or ignores the packet flow and ends communication with challenged endpoint 100a.

During the exchange of challenge request and response between challenger endpoint 100c and challenged endpoint 100a, the communication session continues between endpoints 100. Challenged endpoint 100a will continue sending packets to challenger endpoint 100c and challenger endpoint 100c will send packets to challenged endpoint 100a. For example, challenged endpoint 100a and challenger endpoint 100c send packets every 10 milliseconds. Even though challenger endpoint 100c sends a challenge, the transmission of packets continues between challenged endpoint 100a and challenger endpoint 100c. The challenge takes time to get through the network depending on the physical distance between challenged endpoint 100a and challenger endpoint 100c. The challenge may take 0 milliseconds to 40 milliseconds to reach challenged endpoint 100a. While the challenge goes through the network, challenged endpoint 100a does not know a challenge has been sent and continues sending packets to challenger endpoint 100c. Even after challenged endpoint 100a receives and responds to the challenge, challenged endpoint 100a continues sending packets.

Modifications, additions, or omissions may be made to protection device 102 without departing from the scope of the invention. The components of protection device 102 may be integrated or separated according to particular needs. For example, authentication module 208 may be included in endpoint 100, server 106, or any suitable device in system 10. Moreover, the operations of protection device 102 may be performed by more, fewer, or other modules. Additionally, operations of protection device 102 may be performed using any suitable logic comprising software, hardware, other logic, or any suitable combination of the preceding.

FIG. 3 is a flowchart 30 illustrating one embodiment of a method for authenticating an endpoint 100 that may be used with system 10 of FIG. 1. The method begins at step 300 where a challenger endpoint 100c communicates with a challenged endpoint 100a. In the illustrated embodiment, protection device 102 determines whether to initiate a challenge. For example, a challenge may be initiated if the packet flow from challenged endpoint 100a exceeds a threshold at step 302. The threshold may be used to determine whether challenger endpoint 100c is receiving an excessive packet flow. Protection device 102 may also initiate a challenge if the packet flow has unusual characteristics, if challenger endpoint 100c is under attack from other endpoints 100, or for any other suitable reason. If the packet flow does not exceed the threshold, the communication continues between challenged endpoint 100a and challenger endpoint 100c at step 300. If the packet flow exceeds the threshold, the authentication process begins.

At step 304, protection device 102 sends a challenge request to challenged endpoint 100a. Protection device 102 expects to receive an actual response identification comprising an expected response identification from a legitimate challenged endpoint 100a. Protection device 102 receives an actual response identification from challenged endpoint 100a at step 306.

At decisional step 308, protection device 102 determines whether the expected response identification matches the actual response identification. If the expected response identification matches the actual response identification, challenged endpoint 100a is legitimate and the communication between challenged endpoint 100a and challenger endpoint 100c continues at step 310. At decisional step 312, system 10 determines whether a termination message is received. If a termination message is not received, the communication continues from step 310. If the termination message is received, the method ends.

If the expected response identification does not match the actual response identification at decisional step 308, challenged endpoint 100a is illegitimate and protection device 102 may execute actions on the packet flow at step 314. Such actions may include blocking the packet flow or ignoring the packet flow. The actions taken on the packet flow terminate the communication between challenged endpoint 100a and challenger endpoint 100c at step 316 and the method subsequently ends.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an endpoint may determine whether a sender of packets is legitimate or illegitimate. By authenticating the sender, the endpoint may detect the flow of packets that may attack the endpoint or an illegitimate flow of packets. Detecting the flow of packets before accepting the packets allows the endpoint to anticipate possible attacks and reject illegitimate packet flows.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for authenticating an endpoint in a network, comprising:
   facilitating communication of a plurality of packets between a first endpoint and a second endpoint over the network;
   sending a challenge request to the second endpoint, the challenge request attempting to authenticate the second endpoint, the challenge request comprising an identification that includes a real-time transport protocol synchronization source (RTP SSRC) of a previously sent packet of the plurality of packets, a challenge type, and a sequence number;
   receiving a response from the second endpoint to the challenge request, the response comprising an actual response identification; and
   verifying, by a processor, the received response to establish whether the second endpoint is legitimate, the second endpoint being legitimate if the actual response identification comprises an expected response identification, wherein the expected response identification comprises the sequence number and the RTP SSRC linked to a username associated with the second endpoint, wherein the communication of the plurality of packets between the first and second endpoints continues during authentication of the second endpoint.

2. The method of claim 1, wherein sending the challenge request comprises:
   determining whether to initiate the challenge request; and
   sending the challenge request upon determining to initiate the challenge request.

3. The method of claim 1, wherein the sequence number associates the expected response identification with the challenge request.

4. The method of claim 3, wherein verifying the received response comprises determining whether the actual response identification comprises the sequence number.

5. The method of claim 1, wherein verifying the received response comprises verifying a username associated with the second endpoint.

6. The method of claim 1, wherein verifying the received response comprises determining whether a name verifier in the received response is valid, the name verifier associated with the challenge request.

7. The method of claim 1, further comprising blocking information received from the second endpoint if the received response with the actual response identification fails to correspond to the expected response identification.

8. The method of claim 1, further comprising ignoring information received from the second endpoint if the received response with the actual response identification fails to correspond to the expected response identification.

9. A system for authenticating an endpoint in a network, comprising:
   a server coupled to a plurality of endpoints and operable to facilitate communication of a plurality of packets between a first endpoint and a second endpoint over the network; and
   a protection device coupled to the plurality of endpoints and operable to:
      send a challenge request to the second endpoint, the challenge request attempting to authenticate the second endpoint, the challenge request comprising an identification that includes a real-time transport protocol synchronization source (RTP SSRC) of a previously sent packet of the plurality of packets, a challenge type, and a sequence number;
      receive a response from the second endpoint to the challenge request, the response comprising an actual response identification; and
      verify the received response to establish whether the second endpoint is legitimate, the second endpoint being legitimate if the actual response identification comprises an expected response identification, wherein the expected response identification comprises the sequence number and the RTP SSRC linked to a username associated with the second endpoint, wherein the communication of the plurality of packets between the first and second endpoints continues during authentication of the second endpoint.

10. The system of claim 9, the protection device further operable to send the challenge request by:
    determining whether to initiate the challenge request; and
    sending the challenge request upon determining to initiate the challenge request.

11. The system of claim 9, the protection device further operable to send the challenge request, the sequence number associating the expected response identification with the challenge request.

12. The system of claim 11, the protection device further operable to verify the received response by determining whether the actual response identification comprises the sequence number.

13. The system of claim 9, the first endpoint operable to verify the received response by verifying a username associated with the second endpoint.

14. The system of claim 9, the second endpoint operable to discard the challenge request if the second endpoint fails to transmit the response to the first endpoint.

15. The system of claim 9, the first endpoint operable to block information received from the second endpoint if the received response with the actual response identification fails to correspond to the expected response identification.

16. The system of claim 9, the first endpoint operable to ignore information received from the second endpoint if the received response with the actual response identification fails to correspond to the expected response identification.

17. A non-transitory computer-readable storage medium encoding software for authenticating an endpoint in a network, the software, when executed, operable to
 facilitate communication of a plurality of packets between a first endpoint and a second endpoint over the network;
 send a challenge request to the second endpoint, the challenge request attempting to authenticate the second endpoint, the challenge request comprising an identification that includes a real-time transport protocol synchronization source (RTP SSRC) of a previously sent packet of the plurality of packets, a challenge type, and a sequence number;
 receive a response from the second endpoint to the challenge request, the response comprising an actual response identification; and
 verify the received response to establish whether the second endpoint is legitimate, the second endpoint being legitimate if the actual response identification comprises an expected response identification, wherein the expected response identification comprises the sequence number and RTP SSRC linked to a username associated with the second endpoint, wherein the communication of the plurality of packets between the first and second endpoints continues during authentication of the second endpoint.

18. The non-transitory computer-readable storage medium of claim 17 wherein the sequence number associates the expected response identification with the challenge request.

19. The non-transitory computer-readable storage medium of claim 18 further operable to verify the received response by determining whether the actual response identification comprises the sequence number.

20. The non-transitory computer-readable storage medium of claim 17 further operable to verify the received response by verifying a username associated with the second endpoint.

21. The non-transitory computer-readable storage medium of claim 17 further operable to block information received from the second endpoint if the received response with the actual response identification fails to correspond to the expected response identification.

22. The non-transitory computer-readable storage medium of claim 17 further operable to ignore information received from the second endpoint if the received response with the actual response identification fails to correspond to the expected response identification.

23. A protection device, comprising:
 a challenge module operable to send a challenge request to an endpoint, the challenge request attempting to authenticate the endpoint, the challenge request comprising an identification that includes a real-time transport protocol synchronization source (RTP SSRC) of a previously sent packet of the plurality of packets, a challenge type, and a sequence number; and
 a response module coupled to the challenge module operable to:
  receive a response from the endpoint to the challenge request, the response comprising an actual response identification; and
  verify the received response to establish whether the endpoint is legitimate, the endpoint being legitimate if the actual response identification comprises an expected response identification, wherein the expected response identification comprises the sequence number and RTP SSRC linked to a username associated with the endpoint.

24. The protection device of claim 23, further comprising a protection module operable to protect a communication session from illegitimate traffic.

25. A system for authenticating an endpoint in a network, comprising:
 means for facilitating communication of a plurality of packets between a first endpoint and a second endpoint over the network;
 means for sending a challenge request to the second endpoint, the challenge request attempting to authenticate the second endpoint, the challenge request comprising an identification that includes a real-time transport protocol synchronization source (RTP SSRC) of a previously sent packet of the plurality of packets, a challenge type, and a sequence number;
 means for receiving a response from the second endpoint to the challenge request, the response comprising an actual response identification; and
 means for verifying the received response to establish whether the second endpoint is legitimate, the second endpoint being legitimate if the actual response identification comprises an expected response identification, wherein the expected response identification comprises the sequence number and RTP SSRC linked to a username associated with the second endpoint, wherein the communication of the plurality of packets between the first and second endpoints continues during authentication of the second endpoint.

* * * * *